UNITED STATES PATENT OFFICE.

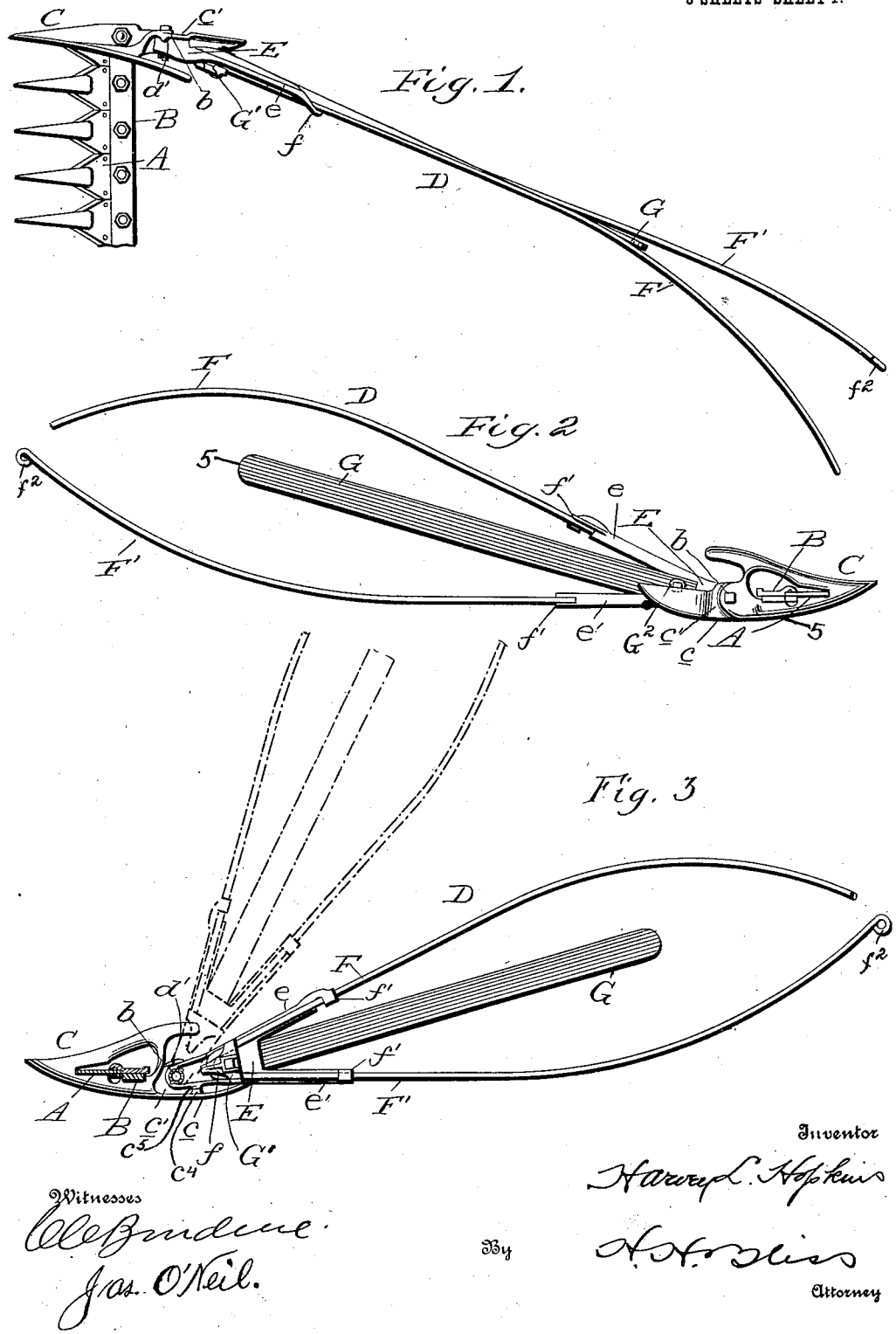

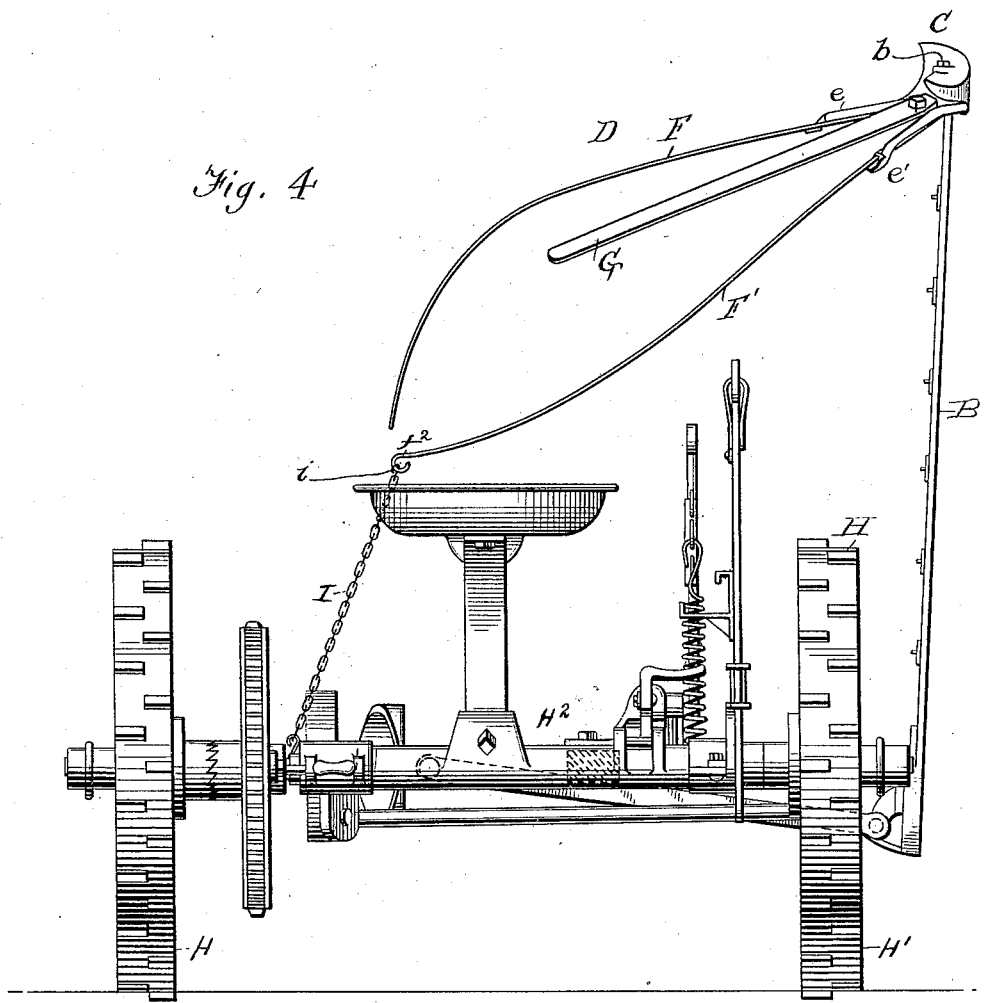

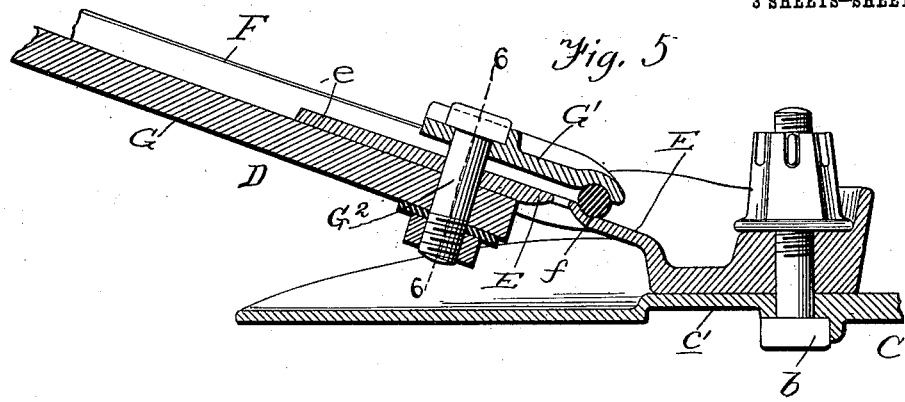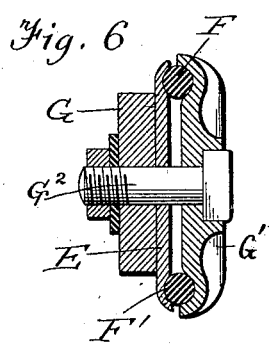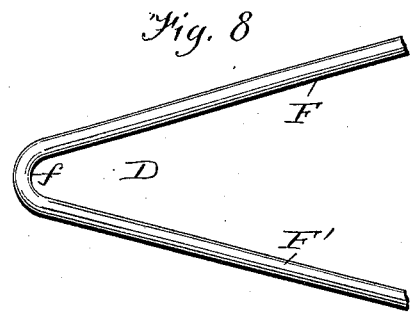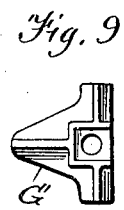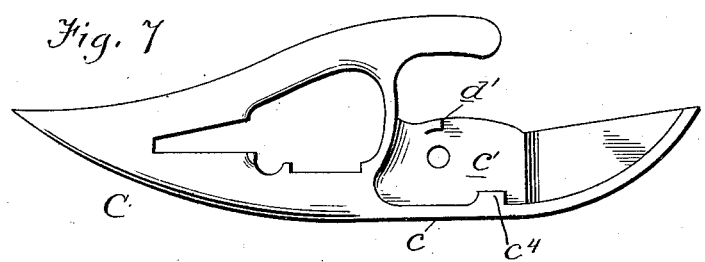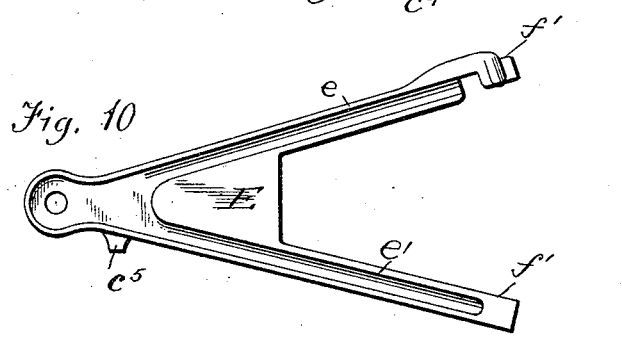

HARVEY L. HOPKINS, OF CHICAGO, ILLINOIS, ASSIGNOR TO HOPKINS PATENT COMPANY, A CORPORATION OF ILLINOIS.

MOWER AND HARVESTER.

1,054,773.  Specification of Letters Patent.  Patented Mar. 4, 1913.

Application filed August 26, 1905, Serial No. 275,927. Renewed February 11, 1909. Serial No. 477,463.

*To all whom it may concern:*

Be it known that I, HARVEY L. HOPKINS, a citizen of the United States, residing at Chicago, in the county of Cook and State of Illinois, have invented certain new and useful Improvements in Mowers and Harvesters, of which the following is a specification, reference being had therein to the accompanying drawing.

This invention relates to improvements in mowers, relating more particularly to that part of a mowing machine which is generally called the track clearer or divider; that is to say, the device at the outer end of the cutting apparatus which acts to effect a separation between the cut grass and the standing grass, and in doing so throws the cut stalks or blades inward toward the stubble.

Figure 1 is a plan view of a portion of the cutting apparatus of a mowing machine, sufficient to illustrate the manner of embodying my improvements. Fig. 2 is a side elevation from the grass side of the machine. Fig. 3 is an elevation of the track clearer from the stubble side. Fig. 4 is a rear view, showing parts of the mowing machine sufficient to illustrate the manner of supporting the cutting apparatus when in its elevated or folded position. Fig. 5 is a section on the line 5—5 of Fig. 2 partly broken away; Fig. 6 is a section on the line 6—6 of Fig. 5; Fig. 7 is an enlarged side view of the finger bar supporting shoe, this view of the shoe being similar to that shown in Fig. 3; Fig. 8 is a view of the connected ends of the elastic sweep arms; Fig. 9 shows one of the clamping members for said arms, and Fig. 10 shows the other clamping member for said arms.

In the drawings I have shown the track clearer as applied to a mowing machine, having a cutting apparatus comprising a cutter bar, indicated by A, and a finger bar, indicated by B, the latter being at its outer end supported by shoe C, adapted to slide over the ground. Inasmuch as the parts which relate more particularly to the present improvements may be employed with a cutting apparatus of any of the well known forms, it is not necessary to herein illustrate or describe the latter in detail.

The shoe C is adapted to rest upon and slide over the ground and is provided with an upward rising flange $c'$. To this is pivoted the track-clearer, indicated as an entirety by D. It is secured to the vertical wall $c'$ by a pivot pin $b$ which allows sufficient freedom of movement. Its motions, however, are limited, there being a stop at $d'$ which prevents the clearer from moving upward or forward beyond the desired limit, and the bottom plate $c$ of the shoe may serve as a limiting device against motion in the other direction, though I prefer to provide stop lugs to serve as a limiting device, one on the bottom plate, as shown at $c^4$, and one on the track clearer, as shown at $c^5$.

The clearer D, as illustrated, comprises the carrier part E, and the fingers or sweep arms F, F', and preferably there is also a bar G, which is horizontal midway between these arms F, F'. The carrier E is a casting, preferably approximately triangular in general outline when viewed horizontally. Through the narrower end passes the pivot pin $b'$ which connects the clearer to the shoe. It is also formed with two arms or bars, $e$, $e'$, extending backward. The fingers or arms F, F' are secured in any suitable way to this carrier. By preference they are formed of a single metallic rod, bent so that these arms shall be peculiarly shaped, and each having a conformation differing from that of the other. These special conformations combined with the spring and consequent elasticity of the sweep fingers give the cut grass a rolling movement, stubbleward, instead of a push or sliding movement which is given by other track-clearers. This rolling movement of the cut grass stubbleward clears a better track and requires much less power in clearing it, as it is easier to roll or turn the grass in windrow shape than to slide or push and shove the grass on the ground. The track-clearers of mowing machines being so far away from the draft point, any saving of power or force required to clear the track is a great desideratum, and the side draft of the machine is correspondingly decreased. The elasticity of the sweep fingers permits them to yield when contacting with obstructions, thus lessening the side draft and the direct draft, and preventing breakages. The connecting bend at $f$ is seated in a recess or socket formed when the carrier E is cast, and the arms at points in rear of the bend lie below retaining bars $f'$ formed on the carrier. The arms are detachably fastened rigidly in place against the carrier by means of one or more clamps. As shown, there is a single clamp at G', which fits against the inner face of the bend at $f$, and extends a short distance along each of the arms, being drawn tightly to place by a threaded fastening device $G^2$. The upper arm F, is carried for three or four feet, or any suitable distance, backward, upward and inward; the lower arm F' extends backward along the ground for a relatively short distance, then upward, and finally at the end turns slightly inward toward the stubble. Preferably, in order to attain the best results, the upper arm F, when the arms are looked at in plan view, lies at all points more or less inside of the corresponding points of the lower bar F' at points behind the carrier E. These arms F, F' are constructed of elastic steel of peculiar quality.

In machines of this character as heretofore constructed, so far as my knowledge goes, use has always been made of wooden boards, and wooden arms, as dividers. Originally these wood devices were secured rigidly laterally to the shoe. Experience demonstrated, however, that a movement of the divider relatively to the part which supported it was beneficial, and during later years the custom has been to interpose between the wooden board, or bar, and the shoe a supplemental spring, either inside or outside of the board for the purpose of permitting the track-cleaner to yield when contacting with obstructions upon the ground, and when overloaded with cut grass. This yielding is at the front end only, while the track-clearer swings bodily against the spring, and does not turn or roll the cut grass windrow-like. But I have found that even these later devices in common use are too heavy and sluggish in their movements and are not properly shaped and do not have the required elasticity to effect the proper separation of the cut blades or stalks from those which are still standing, and with which they are more or less tangled or matted; and after long experience have been led to devise a divider of the sort herein presented, which may be regarded as a delicate and sensitive elastic body from the front end to the rear ends of the arms F, F', so formed as to accomplish the purpose above described. Divider devices of the character described also enable me to attain another important end. Upon referring to Fig. 4, it will be seen that after the cutting apparatus has been turned up on the hinge at the inner shoe, and is situated in its uppermost position, as it is when placed for travel or transportation from one place to another, it can be held firmly in such position by means of one or the other of the divider arms F, F'. As shown, the lower arm F' is formed with an eye $f^2$ at its rear end, and when the cutting apparatus is thrown up, as described, this end is carried well across the frame work of the machine, the eye $f^2$ at that time lying approximately near the inner ground wheel H.

I is a short section of chain, secured at a suitable point to the main frame, and having a hook $i$ which can be readily engaged with or disconnected from the eye $f^2$. When the chain and the divider arm are thus connected, the cutting apparatus is firmly sustained in its elevated position; much more firmly than if it were held by the devices heretofore commonly used. The earlier devices have comprised hooks positioned on some part of the frame work near the inner shoe. In such cases the heavy cutter bar and finger bar rely for their support upon devices which are efficient at a short radius only; consequently the weight of the cutting apparatus is seriously in opposition to the holder and it is impossible to secure steadiness, there being constant vibration of the upper end of the bar during transportation. The disadvantages in this respect in the older mechanisms are intensified by the fact that the heavier divider devices, or track clearers, were supported from the elevated ends of the cutting apparatus, and their weight increased the difficulty incident to getting a firm support and made the mechanism when thus folded still more cumbersome and unstable.

When a holder of the kind which I provide is employed, it will be seen that the weight of the cutting apparatus and its leverage are compensated with the utmost efficiency possible by attaching the holder to the upper free end of the cutting apparatus, and the power exerted for locking it is applied to the greatest advantage. And, moreover, it will be further seen that the very part which has heretofore enhanced the difficulty, namely, the divider or track clearer, is here used not only as part of the means for steadying and locking the cutting apparatus, but is itself held firmly in position when the machine is being transported from place to place, and the difficulty from unsteadiness, as well as that from weight, is entirely overcome.

When the operator desires to let the cutting apparatus down into operating position, he detaches the chain I from the divider bar F', grasps the latter in his hand, and permits the finger bar to swing outward and downward until it reaches a position where it is held by the lifting mechanism, and then by means of the lifting lever he lowers it to the ground and to cutting position.

The bar G above referred to as lying in a horizontal position, midway between the upper divider rod F and the lower one at F', is also secured in position on the carrier E by means of the clamp G'. This bar can be of metal or of wood, as desired, wood being preferred by myself. It is intended for, and serves the purpose of supporting the cut grass at points between the two metal rods, and prevents it from being forced or dragged between them, in this respect assisting in effecting a complete separation. It must, however, be elastic so as to yield with the divider arms F, F', and so yielding throughout its entire length it assists the arms in turning or rolling the cut grass windrow-like. I do not claim that short grasses can be thus windrowed, and with such small growths this is not required, but tall grasses or grass with long spears or stalks, lodged clover and many species of alfalfa can be so handled by my improved construction where the old forms of track-clearers give only imperfect results.

What I claim is:—

1. In a mower, the combination with the frame, of cutting apparatus extending therefrom, a shoe secured to the outer end of said cutting apparatus, a carrier pivoted for vertical movement upon said shoe, rearwardly extending track clearing arms at different distances from the ground formed in a single piece, a separately formed track clearing arm intermediate the aforesaid arms and common means for securing all of said arms to said carrier.

2. In a mower, the combination with a frame, of cutting apparatus extending therefrom, a shoe secured to the outer end of said cutting apparatus, a carrier pivoted for vertical movement upon said shoe, rearwardly extending track clearing arms at different distances from the ground formed in a single piece, a separately formed track clearing arm intermediate the aforesaid arms and common means for detachably securing all of said arms to said carrier.

3. In a mower, the combination with the frame, of cutting apparatus extending therefrom, a shoe at the outer end of the cutting apparatus and track clearing means carried by said shoe, said means comprising an arm carrier secured to said shoe and rearwardly extending arms carried thereby, said carrier having grooves adapted to receive certain of said arms and a plane face adapted to receive other of said arms and means for securing said arms to said carrier.

4. In a mower, the combination with the frame, of cutting apparatus extending therefrom, a shoe at the outer end of the cutting apparatus and track clearing means carried by said shoe, said means comprising an arm carrier secured to said shoe and rearwardly extending arms carried thereby, said carrier having grooves adapted to receive certain of said arms and a plane face adapted to receive other of said arms and a common means for securing all of said arms to said carrier.

5. In a mower, the combination with the frame, of cutting mechanism extending therefrom and a clearing arm carrier secured to the outer end of said cutting mechanism, said carrier comprising a member having upon one side grooves adapted to receive rearwardly extending clearing arms and a plane face upon the other side, arms within said grooves, a clamp for securing said arms, a flat arm engaging with the surface upon the opposite side of said member from said grooves and common means for securing the said clamp and said flat arm.

6. In a mower, the combination with the frame, of cutting mechanism extending therefrom and a clearing arm carrier secured to the outer end of said cutting mechanism, said carrier comprising a member having upon one side grooves adapted to receive rearwardly extending clearing arms and a plane face upon the other side, arms within said grooves, a clamp for securing said arms, a flat arm engaging with the surface upon the opposite side of said member from said grooves and a bolt passing through said clamp and said flat arm for securing the same.

7. In a mower, the combination with the frame, of cutting apparatus extending therefrom, a track clearing arm extending rearwardly from the outer end of said cutting mechanism and bent at its rear end to form an eye, of means for connecting said eye with said frame whereby the cutting apparatus is sustained in vertical position.

8. In a mower, the combination of a frame, cutting apparatus comprising a finger bar flexibly connected to the frame, a track clearing arm extending rearward from the outer end of the finger bar, and means for detachably connecting the free end of said arm to the frame when the finger bar is folded.

9. In a mower, the combination of a frame, cutting apparatus comprising a finger bar flexibly connected to the frame, a resilient track clearing arm extending rearward from the outer end of the finger bar, and means for detachably connecting the free end of said arm to the frame when the finger bar is folded.

10. In a mower, the combination of a frame, cutting apparatus comprising a finger bar flexibly connected to the frame, a lever for raising and lowering the finger bar, a track clearing arm extending rearward from the outer end of the finger bar, and
5 means independent of the lever for detachably connecting the free end of said arm to the frame when the finger bar is folded.

In testimony whereof I affix my signature, in presence of two witnesses.

HARVEY L. HOPKINS.

Witnesses:
CHARLES H. POPE,
CHRIS. H. ANDERSEN.

Copies of this patent may be obtained for five cents each, by addressing the "Commissioner of Patents, Washington, D. C."